UNITED STATES PATENT OFFICE.

HENRY C. McMILLIN, OF LIMA, OHIO.

COMPOSITION OF MATTER FOR PLASTERING.

SPECIFICATION forming part of Letters Patent No. 605,898, dated June 21, 1898.

Application filed July 29, 1897. Serial No. 646,426. (No specimens.)

*To all whom it may concern:*

Be it known that I, HENRY C. MCMILLIN, a citizen of the United States, residing at Lima, county of Allen, and State of Ohio, have invented a new and useful Composition of Matter to be Used as a Hard Plaster for Finishing Walls of Buildings, of which the following is a specification.

My composition consists of the following ingredients combined in the proportions stated, viz: plaster-of-paris, eighty pounds; Louisville cement, ten pounds; Portland cement, ten pounds; sharp clean sand, two hundred pounds; cream of tartar, one and one-half ounces; borax, pulverized, one-half ounce; lime, nine pounds; hair, three-fourths of a pound; water, eleven and one-half gallons.

In combining the above-specified ingredients I first thoroughly mix in the dry state by suitable means the plaster-of-paris, cements, sand, cream of tartar, and borax. I then slake the lime in two and a half gallons of water, then add the hair, such as is commonly used in plaster, and thoroughly distribute it in the lime and water. The combined lime and hair are now added to and thoroughly mixed with the other ingredients, which were first combined in the dry state, and nine gallons of water are also added, being suitably accomplished by placing the dry composition in one end of a mixing-box and the plastic composition in the opposite end of the box, then adding the nine gallons of water to the plastic lime and hair, thoroughly stirring to distribute the hair, and then incorporating this with the dry composition, thoroughly stirring the whole, so that an even distribution of the ingredients is insured. This will provide sufficient plaster for ten yards, two coats, and may be applied in the usual manner to lathe, brick, or stone walls and finished to a smooth surface, which will be superior and not of itself disposed to crack.

While the proportion of water is specified as a rule, this quantity may be varied slightly as circumstances may require, as it is obvious that a proper consistency is necessary for properly applying the plaster to various kinds of walls.

I am aware that the most of the ingredients have been used in different ways for the purpose for which this composition is designed, but that no composition of the ingredients and in the proportions such as I herein describe has been used.

What I claim, and desire to secure by Letters Patent, is—

A composition of matter to be used to form a coating on walls, consisting of plaster-of-paris, Louisville cement, Portland cement, sand, cream of tartar, borax, lime, hair and water, and combined in the proportions and manner substantially as hereinbefore specified.

H. C. McMILLIN.

Witnesses:
H. C. HAMMACK,
W. H. CUNNINGHAM.